(No Model.) 3 Sheets—Sheet 1.

L. B. GIFFORD.
CAR MOVER.

No. 413,228. Patented Oct. 22, 1889.

WITNESSES
Anna J. Lehaney
Luther G. Raymer

INVENTOR
Lord B. Gifford
By William Webster
Atty (No Model.) 3 Sheets—Sheet 2.
L. B. GIFFORD.
CAR MOVER.
No. 413,228. Patented Oct. 22, 1889.
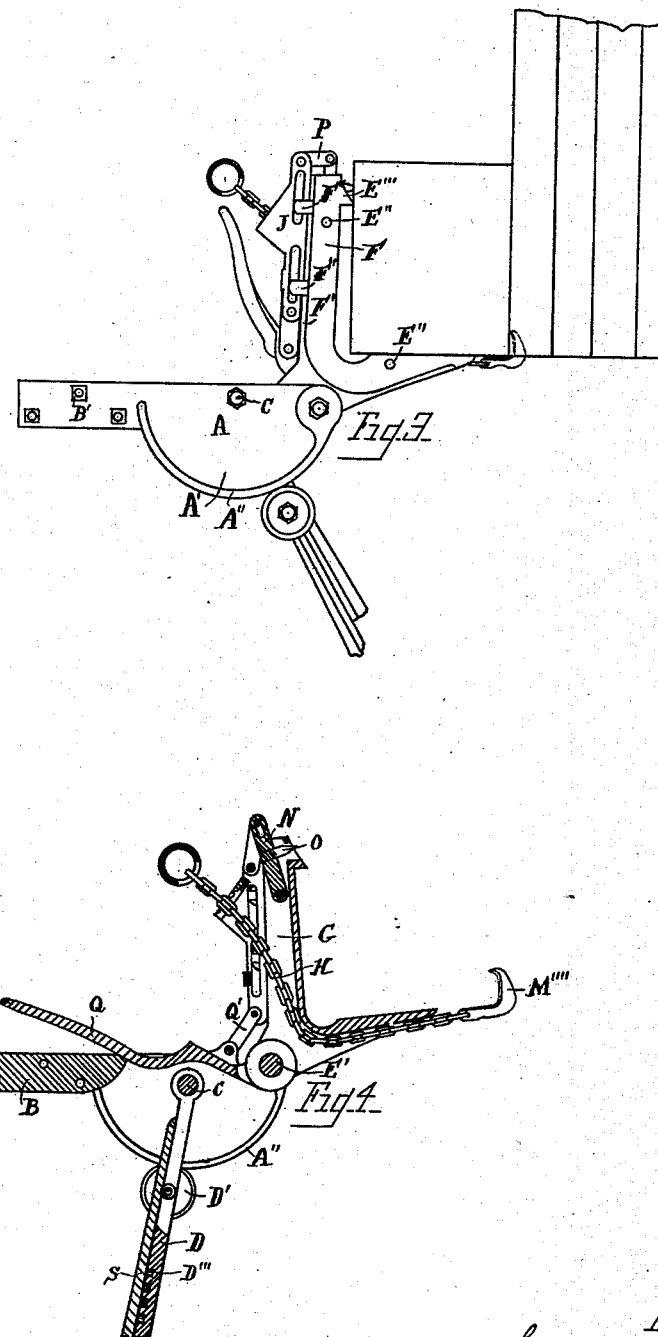

(No Model.) 3 Sheets—Sheet 3.
L. B. GIFFORD.
CAR MOVER.
No. 413,228. Patented Oct. 22, 1889.
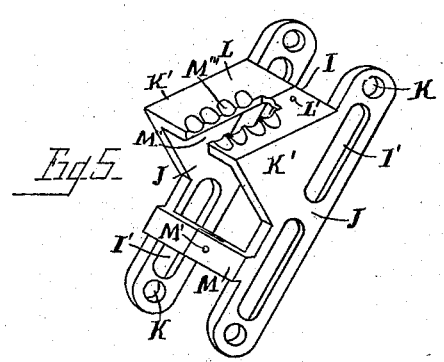
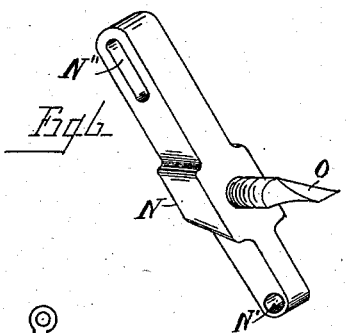
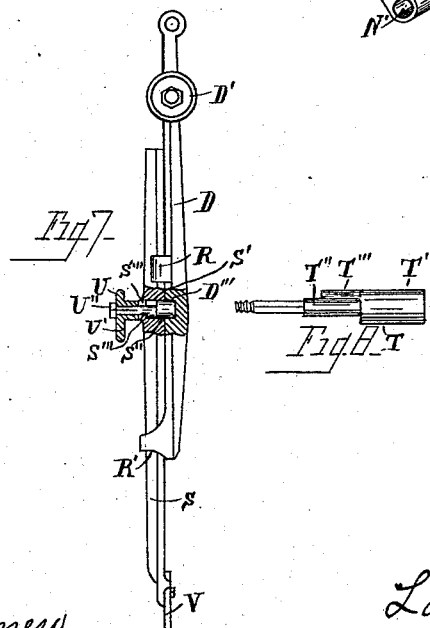
WITNESSES
Anna J. Lehaney
Luther G. Raymer
INVENTOR
Lord B. Gifford
By William Webster
Att'y

UNITED STATES PATENT OFFICE.

LORD B. GIFFORD, OF TOLEDO, OHIO.

CAR-MOVER.

SPECIFICATION forming part of Letters Patent No. 413,228, dated October 22, 1889.

Application filed July 22, 1889. Serial No. 318,190. (No model.)

*To all whom it may concern:*

Be it known that I, LORD B. GIFFORD, a citizen of the United States, residing at Toledo, in the county of Lucas and State of Ohio, have invented certain new and useful Improvements in Car-Movers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to car-movers of that class employed in moving empty or loaded cars upon sidings and around warehouses, elevators for grain, mills, &c., and by which means one or more loaded or empty cars may be moved either forward or backward.

The object of the invention is to so arrange a lever purchase and fastening to the car that the operator may be enabled to pull a car or cars with a continuous motion, or back the car with the same motion of the lever without great manual effort.

Figure 1:
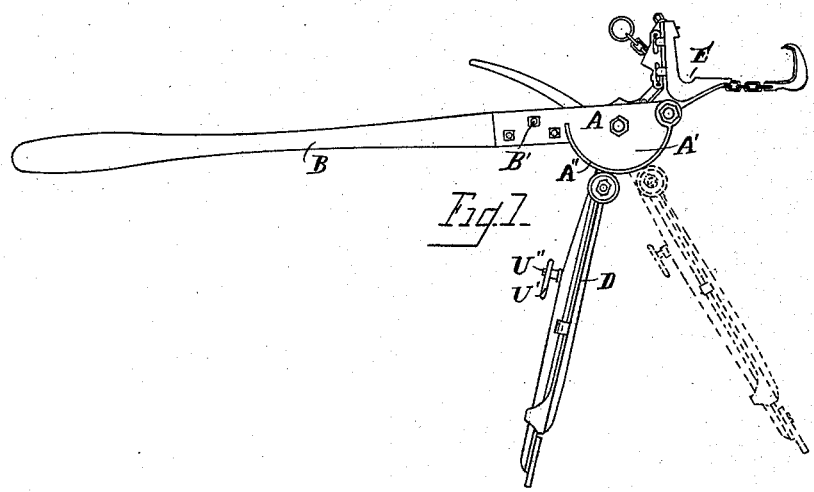
Figure 2:
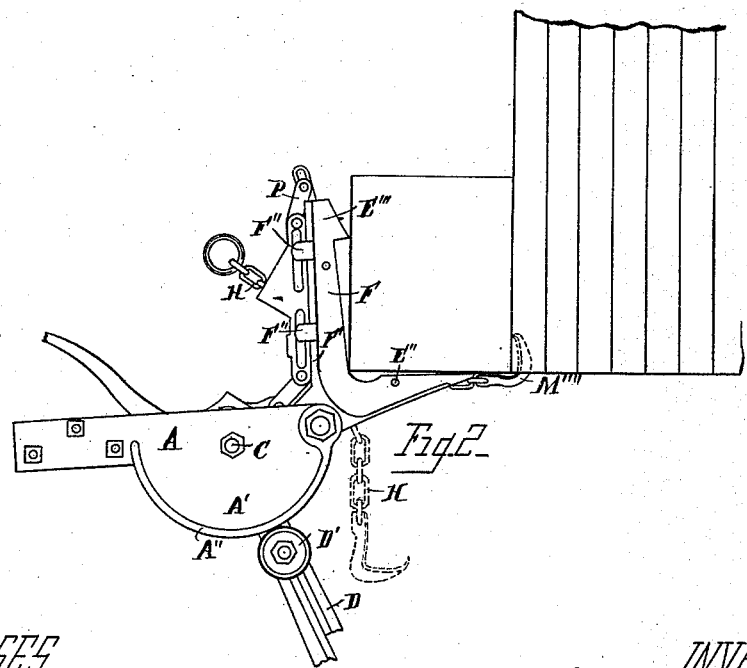

In the drawings, Figure 1 is a side elevation of a complete device, showing one position of the leg in full lines and a different adjustment in dotted lines. Fig. 2 is an enlarged sectional view of the operative mechanism as attached to a car prior to operating the lever to cause tension upon the chain, and the projection of a fastening-stud, the chain and hook being also shown in dotted lines as disengaged. Fig. 3 is a like view of the operating mechanism with the lever raised to project the stud and cause tension upon the chain. Fig. 4 is a longitudinal sectional view of the operative mechanism. Fig. 5 is a detached view of the chain-holder. Fig. 6 is a detail view of the stud-lever. Fig. 7 is a side elevation of the adjustable leg, a portion being broken away to disclose the catch. Fig. 8 is a detail view of the catch.

A designates side plates, one of which is secured upon each side of a lever B by bolts B'. Plates A are straight upon the upper side, and are formed with a semicircular projection A' upon the lower side, this projection being re-enforced by peripheral flanges A'', to form a bearing concentric to a pivot-bolt C, upon which is pivoted a section D of a leg-support between the plates, and upon which are journaled anti-friction rollers D', adapted to bear upon the semicircular flanges A''.

Between the end of the plates opposite to that to which the lever B is secured is pivoted an angled plate E, by means of a pivot-bolt E'. Plate E is formed of two sections secured together by rivets or bolts E'', each section being formed with angled sides F, re-enforced by a rib F', having lugs F'' formed integral therewith, which project at right angles to the sides, whereby there is formed a push-plate having an angle to fit the end sill of the car, and provided with a recess G upon the inner side, in which is placed a chain H, adapted to be secured to the sill, as will be more fully described, and the right-angled lugs F'', which project in parallel relation to the face side of the plate and retain a chain-holder I in place by entering elongated slots I' formed therein.

Chain-holder I is formed of two side plates J, having perforations K at each end thereof, and elongated slots I' intermediate of the same. Upon the rear side of each plate is formed an inverted-V-shaped projection K', having a right-angled plate L upon the upper side thereof, which meet and overlap at the rear side and are secured together by a rivet L' at this point and by angled straps M at the lower portion thereof, secured by a rivet M'. Plate L as constructed of the two parts is cut away centrally thereof, forming an opening M'', adapted to receive links of the chain H, the upper portion of the plate being formed with semicircular recesses M''', into which any desired link may be placed to determine the length of the free end of the chain, to cause a hook M'''' to engage with the rear side of the sill of the car.

N designates a stud-lever, formed with a perforation N' at the lower end and an elongated slot N'' at the upper end, there being a pointed stud O intermediate the same. Lever N is secured between the sections of the angled plate by means of the rivet or bolt E'' passed through the sections and perforation N', the upper end being secured to bars P at one end of the same, the opposite end of the bars being secured to the upper end of the chain-holder, the lower end of the chain-holder being connected with a lever Q, secured upon bolt E' by means of bars Q', secured to the lever and chain-holder, the bars being of a length to cause the lever, when raised, to lock the chain-holder in an elevated position, thereby causing tension upon the chain, and at the same time projecting the stud O to cause the same to engage with the end sill of the car. In a preferred construction of angled plate the vertical portion is inclined from the lower portion to near the top, at which point there is a right-angled projection E''', adapted to indent somewhat into the sill when tension is put upon the chain, and above this projection is an opening through which the stud O projects. The leg consists of a section D, formed with retaining-lugs R centrally of the length thereof, and an opening R' at the lower end, there being a lower telescopic section S movable within the same and held to any desired adjustment relative to height by means of a catch T, which engages in perforations D''' in section D.

As it is essential that catch T shall be in locked engagement when the leg-sections are adjusted and at the same time convenient of withdrawal for adjusting the same, I have devised a peculiar catch comprising the following feature: S' designates a perforation formed transversely through section S and having two diameters, the larger S'' being upon the inner portion of the section and the smaller portion S''' extending therefrom to the outer side and having a keyway S'''' through the upper side of a diameter corresponding to the perforation S''. Catch T is formed with an end portion T' of a diameter corresponding with the portion S'' of the perforation S, and a reduced portion T'' of a diameter corresponding to the perforation S''', with a key T''' adapted to enter the keyway S'''', the outer end of the catch being squared to receive a handle U, having a weighted end U' adapted to cause the catch to turn normally to cause the key T''' to abut against the side of the perforation S'' and lock the same from transverse movement, the catch being withdrawn by turning the weighted end of the handle in a reverse position to allow the key to pass into the keyway. The handle is preferably secured to the catch by a nut U'' run upon the threaded end thereof. The lower end of section S is formed with a removable catch V, adapted to rest upon the track and hold the leg from slipping thereon when power is applied to move a car.

In operation to pull a car forward the leg is inclined, as shown in dotted lines, Fig. 1, hook M'''' is engaged with the rear side of the sill of the car, and the chain drawn taut and held in this condition by engaging one of the links in a recess M''' in the chain-holder. Lever Q is now raised, causing the chain-holder to move vertically, thereby forcing the point of the hook M'''' into the sill, and also projection E''', and by means of plates P, causing stud-lever N to move from an inclined to a vertical position, thereby forcing stud O into the sill, by which means the mover is securely fastened to the car and moves with the same when operated upon. The operator raises and lowers the lever B, bolt C being the fulcrum, and the concentric bearing A'' riding upon anti-friction rollers D' enables the operator to move one or more cars with ease, and as the leg moves upon the track as fast as the car is advanced the operation is continuous. To push a car or cars the the leg is placed in the position shown in full lines, Fig. 1, with the same operation of the lever. To cause the leg to move in the arc of a circle upon the pivot-bolt C, and thereby cause the anti-friction rollers D' to bear concentrically upon the peripheral flanges A'' whether pulling or pushing a car, the perforation in section D of the leg is circular and of a diameter to allow the pivot to move closely therein. To adjust the mover to cars of different heights, the handle U is turned to cause key T''' to register with keyway S'''', when the catch may be withdrawn from perforations D''', when the section S can be raised or lowered, as desired. It will be observed that the bars Q' are of a length to cause lever Q to lie in parallel relation with the chain-holder when the lever is raised, thereby locking the same in position.

What I claim is—

1. In a car-mover, an angle-plate and a lever connected therewith by means of side plates formed with a semicircular bearing concentric with a pivot-bolt, in combination with a leg movable upon the pivot-bolt and provided with rollers adapted to rest upon the circular bearings, said leg moving concentrically when adjusted to push or pull by means of the pivot-bolt passing through a circular perforation formed in the upper part of the same, substantially as and for the purpose set forth.

2. In a car-mover, an angle-plate formed with a recess in the rear side thereof and lugs projecting at right angles thereto, in combination with a chain-holder formed with elongated openings, into which the lugs project, a lever for raising the chain-holder, and a chain resting within the recess and held to any desired adjustment by being engaged with the chain-holder and put in tension thereby, as and for the purpose set forth.

3. In a car-mover, side plates, an angle-plate pivoted thereto, a lever pivoted between the side plates, and a stud-lever pivotally connected with the angle-plate and with said lever, whereby, when the first-named lever is raised, the stud is projected through an opening in the angle-plate, as and for the purpose set forth.

4. In a car-mover, an angle-plate, a lever pivotally connected therewith, a chain-holder movably connected with the angle-plate and with the lever by plates of a length to lock in vertical alignment with the plate-holder when raised, and a plate upon the chain-holder formed with a recess, in combination with a chain passed through the recess and engaging with the sides of the plate, as and for the purpose set forth.

5. In a car-mover, a leg formed of an upper section having a series of perforations, in combination with a lower section movably secured to the upper section and formed with a perforation having a keyway, and a catch within the perforation formed with a key adapted to register with the keyway and allow of lateral movement thereby and be locked from lateral movement when out of alignment therewith, as and for the purpose set forth.

In testimony that I claim the foregoing as my own I hereby affix my signature in presence of two witnesses.

LORD B. GIFFORD.

Witnesses:
WILLIAM WEBSTER,
ANNA J. LEHANEY.